United States Patent
Fox et al.

(10) Patent No.: US 9,463,434 B2
(45) Date of Patent: Oct. 11, 2016

(54) HEAT REACTIVATED ADSORBENT GAS FRACTIONATOR AND PROCESS

(71) Applicant: SPX Corporation, Charlotte, NC (US)

(72) Inventors: Timothy J. Fox, Waynesburg, PA (US); John E. Thelen, Ocala, FL (US)

(73) Assignee: SPX FLOW TECHNOLOGY USA, INC., Ocala, FL (US)

( * ) Notice: Subject to any disclaimer, the term of this patent is extended or adjusted under 35 U.S.C. 154(b) by 106 days.

(21) Appl. No.: 14/169,569

(22) Filed: Jan. 31, 2014

(65) Prior Publication Data

US 2015/0217272 A1 Aug. 6, 2015

(51) Int. Cl.
 *B01D 53/26* (2006.01)
 *B01J 20/34* (2006.01)
 *B01D 53/04* (2006.01)

(52) U.S. Cl.
 CPC ........ *B01J 20/3458* (2013.01); *B01D 53/0438* (2013.01); *B01D 53/0462* (2013.01); *B01D 53/261* (2013.01)

(58) Field of Classification Search
 CPC .. B01J 20/3458; F26B 23/001; B01D 53/04; B01D 53/0438; B01D 53/0462; B01D 53/261; B01D 2257/80; B01D 2259/4009
 USPC ............. 96/121, 126–128, 144, 146; 34/472, 34/473, 80
 See application file for complete search history.

(56) References Cited

U.S. PATENT DOCUMENTS

| | | | |
|---|---|---|---|
| 3,891,410 A | | 6/1975 | Hankison |
| 4,329,158 A | * | 5/1982 | Sircar ................ B01D 53/0462 95/130 |
| 5,087,178 A | * | 2/1992 | Wells ................... B01D 53/261 418/1 |
| 5,137,548 A | * | 8/1992 | Grenier ................. B01D 53/04 95/115 |
| 5,846,295 A | * | 12/1998 | Kalbassi ............ B01D 53/0407 95/105 |
| 6,221,130 B1 | * | 4/2001 | Kolodziej ............ B01D 53/261 95/120 |
| 8,734,571 B2 | * | 5/2014 | Golden .............. B01D 53/0462 95/106 |
| 2004/0244594 A1 | * | 12/2004 | Niclout .............. B01D 53/0462 96/128 |
| 2008/0141714 A1 | | 6/2008 | Cartwright et al. |
| 2010/0300123 A1 | | 12/2010 | Park et al. |
| 2012/0024324 A1 | * | 2/2012 | Force ...................... C08F 10/02 134/31 |
| 2014/0260967 A1 | * | 9/2014 | Gitschlag ............. B01D 53/261 95/41 |

OTHER PUBLICATIONS

International Search Report (ISR) (PCT Form PCT/ISA/210) and the Written opinion of the International Searching Authority of International Application No. PCT/US15/12596, dated Apr. 14, 2015.

* cited by examiner

*Primary Examiner* — Frank Lawrence
(74) *Attorney, Agent, or Firm* — BakerHostetler LLP (57) ABSTRACT

A system for regenerating an adsorbent in an off-line adsorption chamber including: a heat exchanger configured to exchange heat from a first fluid coming from a compressor and a second fluid, wherein only a portion of the first fluid flows through the heat exchanger when the first fluid is gas; a conduit providing fluid communication between the second fluid exiting the exchanger and an off-line adsorption chamber; an adsorbent in the off-line adsorption chamber; and an outlet to the off-line adsorption chamber configured to outlet the second fluid from the off-line adsorption chamber.

15 Claims, 7 Drawing Sheets

HEAT REACTIVATED ADSORBENT GAS FRACTIONATOR AND PROCESS

FIELD OF THE INVENTION

The present invention relates generally to gas drying systems. More particularly, the present invention relates to a system that uses fluid heated by a compressor to preheat a fluid used to regenerate adsorbent in an adsorption chamber in a gas drying system.

BACKGROUND OF THE INVENTION

Industrial systems, particularly pneumatic systems require dry air or another dry gas. If regular ambient air was used there may be too much humidity in it causing corrosion and lack of desired performance. Typical air or other gas drying systems configured to provide dry gas for industrial uses often include adsorption chambers containing an adsorbent material. Over the course of the usage of the system, the adsorbent material may become saturated and cannot effectively or efficiently remove moisture from a gas.

As such, the adsorption chamber may need to be taken off-line and the adsorbent regenerated using a purge gas. Often, drying systems may use two or more different adsorption chambers in order for one adsorption chamber to be used drying the gas while the other adsorption chamber (or adsorption chambers) is(are) being regenerated. In such systems, valves may be used to take the adsorption chambers on and off-line as needed and to flow a purge gas through the off-line adsorption chamber to assist in regeneration of the adsorbent contained in the adsorption chamber.

In many instances the purge gas may be heated prior to entering the off-line adsorption chamber because heated purge gas may be more effective than non-heated purge gas in regenerating the adsorbent. In some instances, the systems may have a compressor which compresses the gas be dried. Compressors are well known to generate heat and it would be efficient if the heat from the compressor could be used to also heat the purge gas.

In some instances, a gas that is being compressed in the compressor has been used as a purge gas. However, in such systems care is taken to ensure that the compressor is a non-lubricated compressor in order to ensure contaminants such as lubricants do not find their way into the purge gas. Such contaminants can contaminate the adsorbent being regenerated causing the adsorbent to lose or reduce its effectiveness.

Accordingly, it is desirable to provide a method and apparatus that may use heat generated by the compressor without necessarily using a compressed gas by the compressor as a purge gas thereby avoiding some of the drawbacks of using compressed gas by the compressor as a purge gas.

SUMMARY OF THE INVENTION

The foregoing needs are met, to a great extent, by the present invention, wherein in one aspect an apparatus is provided that in some embodiments a method and apparatus that may use heat generated by the compressor without necessarily using a gas compressed by the compressor as a purge gas thereby avoiding some of the drawbacks of using compressed gas by the compressor as the purge gas.

In accordance with one embodiment of the present invention, a system for regenerating an adsorbent in an off-line adsorption chamber is provided. The system includes: a heat exchanger configured to exchange heat from a first fluid coming from a compressor and a second fluid, wherein only a portion of the first fluid flows through the heat exchanger when the first fluid is gas; a conduit providing fluid communication between the second fluid exiting the exchanger and an off-line adsorption chamber; an adsorbent in the off-line adsorption chamber; and an outlet to the off-line adsorption chamber configured to outlet the second fluid from the off-line adsorption chamber.

In accordance with another embodiment of the present invention, a method of preheating a purge fluid supplied to an off-line adsorption chamber is provided. The method includes: flowing the purge fluid through a heat exchanger; flowing a heated fluid from a compressor through the heat exchanger thereby heating the purge fluid wherein only a portion of the heated fluid flows through the heat exchanger when the heated fluid is gas; and flowing the purge fluid through an off-line adsorption chamber containing an adsorbent.

In accordance with yet another embodiment of the present invention, a system for regenerating an adsorbent in an off-line adsorption chamber is provided. The system includes: means for exchanging heat between fluids configured to exchange heat from a first fluid coming from a compressor and a second fluid, wherein only a portion of the first fluid flows through the means for exchanging heat when the first fluid is gas; a conduit providing fluid communication between the second fluid exiting the means for exchanging heat and an off-line adsorption chamber; means for desorbing moisture from the off-line adsorption chamber; and an outlet to the off-line adsorption chamber configured to outlet the second fluid from the off-line adsorption chamber.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout. An embodiment in accordance with the present invention provides a system and process for removing a constituent from a gas stream, using an adsorbent fractionator (i.e. a dryer) employing a purge gas source and a heat exchanger to recover heat from the compressor, either directly from the hot compressed discharge gas or indirectly from the hot compressor coolant.

Figure 1:
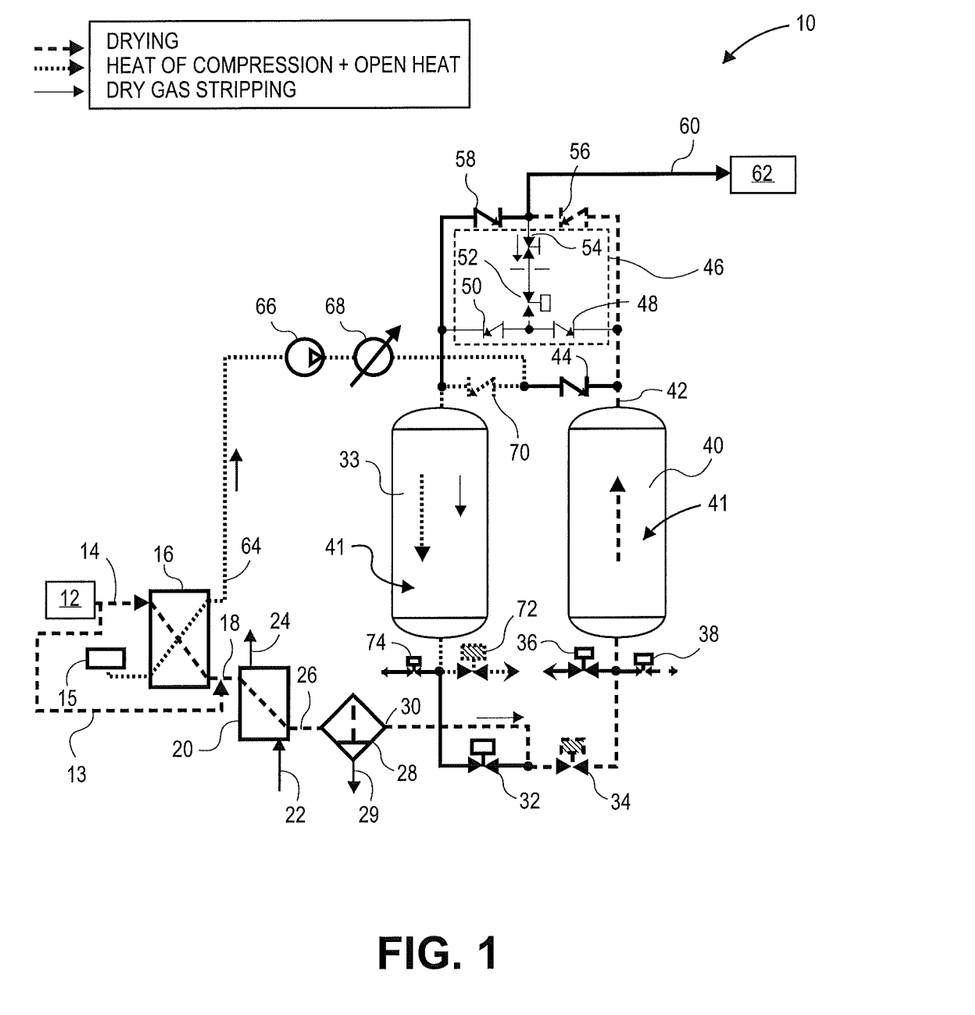
FIG. 1 is a schematic diagram of a gas drying system using compressor heat to preheat a gas used to regenerate an adsorbent in the drying system according to an embodiment.

An embodiment of the present inventive apparatus is illustrated in FIG. 1. FIGS. 1 through 6 illustrate gas dryer systems 10 of various embodiments. The embodiments shown in FIGS. 1 through 6 are similar with the exception of the location or absence of the blower. FIG. 1 will be explained in detail. Descriptions of the differences between the other figures and FIG. 1 will also be described. However, detailed descriptions of each of the other figures will not be made in detail as they will, for the most part, be repetitive with to respect FIG. 1.

FIG. 1 shows a drier system 10. The dryer system 10 includes a compressor 12. Gas is compressed in the compressor 12. As a result of the compression heat is generated within the compressor 12 and the gas. The gas exits the compressor 12. Part of the gas is bled off into a conduit 14 while the remainder of the hot gas flows through conduit 13 and flows directly to the inlet of the trim cooler 20.

The gas in the conduit 14 flows into a heat exchanger 16. Ambient air is drawn into a purge air filter 15 and is filtered and then also flows into the heat exchanger 16. In the heat exchanger 16, heat from the hot gas coming from conduit 14 flows into the second gas that has been filtered through the inlet filter 15. The hot gas from conduit 14 is cooled somewhat and flows out of the heat exchanger 16 and into the conduit 18. It then flows into a trim cooler 20 where it is further cooled by exchanging heat with a fluid flowing through inlet 22 through the trim cooler 20 and out trim cooler outlet 24.

The gas then flows through conduit 26 into a moisture separator 28. Moisture is condensed and separated from the gas and flows through an outlet 29 where it may be disposed of such as through a municipal sewer system or any other suitable disposable system. The gas then flows out of the outlet 30.

Valves 32 and 34 dictate which adsorption chamber 33 or 40 gas exiting the moisture separator will throw flow through. Typically one of the adsorption chambers 33 or 40 is operational and is drying the gas while the other adsorption chamber is taken off-line and is purged in order to regenerate the adsorbent material contained within the adsorption chamber 33 or 40. As shown in FIG. 1, valve 34 is in the open position while valve 32 is in the closed position. Therefore the fluid flows through valve 34 and past purge exhaust valve 36 and depressurization valve 38 and into the adsorption chamber 40. Had the situation been reversed and 34 been closed and 32 been open then the gas would have flowed into adsorption chamber 33 and adsorption chamber 40 would of been off-line and undergoing a purge operation. As the gas flows through the adsorption chamber 40 and over the adsorbent material 41 the gas is dried and flows out of the adsorption chamber into conduit 42.

The gas flows past valve 44 and the dry gas stripping re-pressurization circuit 46. The dry gas stripping and re-pressurization circuit 46 includes valves 48, 50, 52, and 54. These valves may be configured as shown or in any other manner to allow dry gas coming out of either adsorption chamber 40 or 33 to go to conduit 60 to the dry gas user or storage 62. The dry gas stripping supply in re-pressurization circuit 46 may also be set or configured to bleed some of the dry gas from conduit 42 out and sent it to the off-line adsorption chamber (adsorption chamber 33 as shown in FIG. 1) as part of a regeneration process for the off-line adsorption chamber 33. Valves 56 and 58 prevent or allow processed gas to enter the off-line adsorption chamber.

The regeneration of the off-line adsorption chamber 33 is accomplished by the ambient air drawn into the system 10 through the purge inlet filter 15. As mentioned above, the purge air flows through the heat exchanger 16 and is heated by heat from fluid coming into the heat exchanger 16 from conduit 14. After picking up heat in the heat exchanger 16 the purge fluid flows through conduit 64 due to action of the blower 66. The purge fluid may be additionally heated if needed by a trim heater 68. The purge fluid then flows through valve 70 into the off-line adsorption chamber 33 where it will regenerate adsorbent 41 in the off-line adsorption chamber 33. In embodiments where the off-line adsorption chamber is adsorption chamber 40 and not 33, then valve 70 will be shut and valve 44 will be open to allow the purge fluid to flow through adsorption chamber 40. The dry gas stripping supply in re-pressurization circuit 46 is configured such that valve 52 is closed so that no stripping flow joins the purge fluid flowing into one of the adsorption chambers 33 and 40. As shown in FIG. 1, valve 44 is closed and valve 70 is open thereby forcing the purge fluid to flow through the off-line adsorption chamber 33. Once a purge fluid has flowed through off-line adsorption chamber 33 and flows out of the off-line adsorption chamber 33 and through valve 72 where it may be vented to the ambient conditions or may undergo any further operations if desired.

Figure 2:
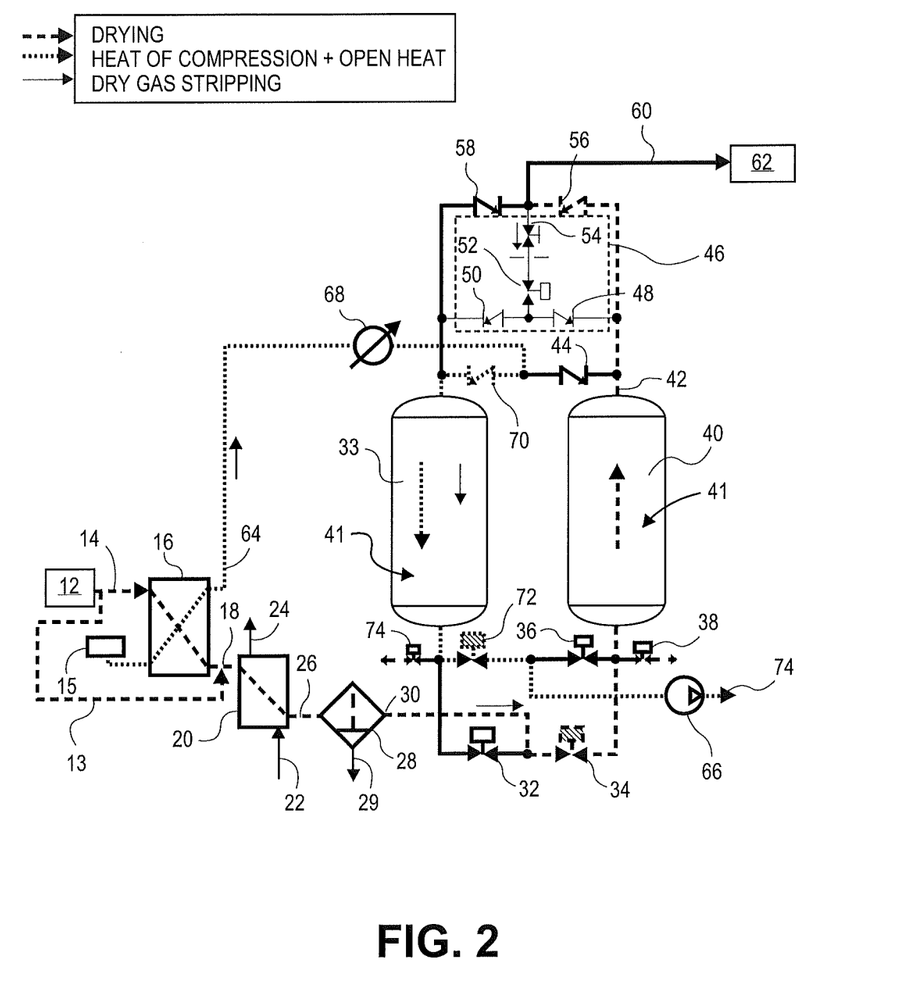
FIG. 2 is a schematic diagram of a gas drying system using compressor heat to preheat a gas used to regenerate an adsorbent in the drying system according to an another embodiment.

FIG. 2 illustrates a system 10 where the blower 66 is not located in front of the trim heater 68 as described in FIG. 1. Rather the blower 66 is located downstream of the adsorption chambers 33 and 40. As shown in FIG. 2, the blower 66 is located downstream of the valves 72 and 36. The blower 66 still provides the function of moving the purge fluid through the system 10.

Figure 3:
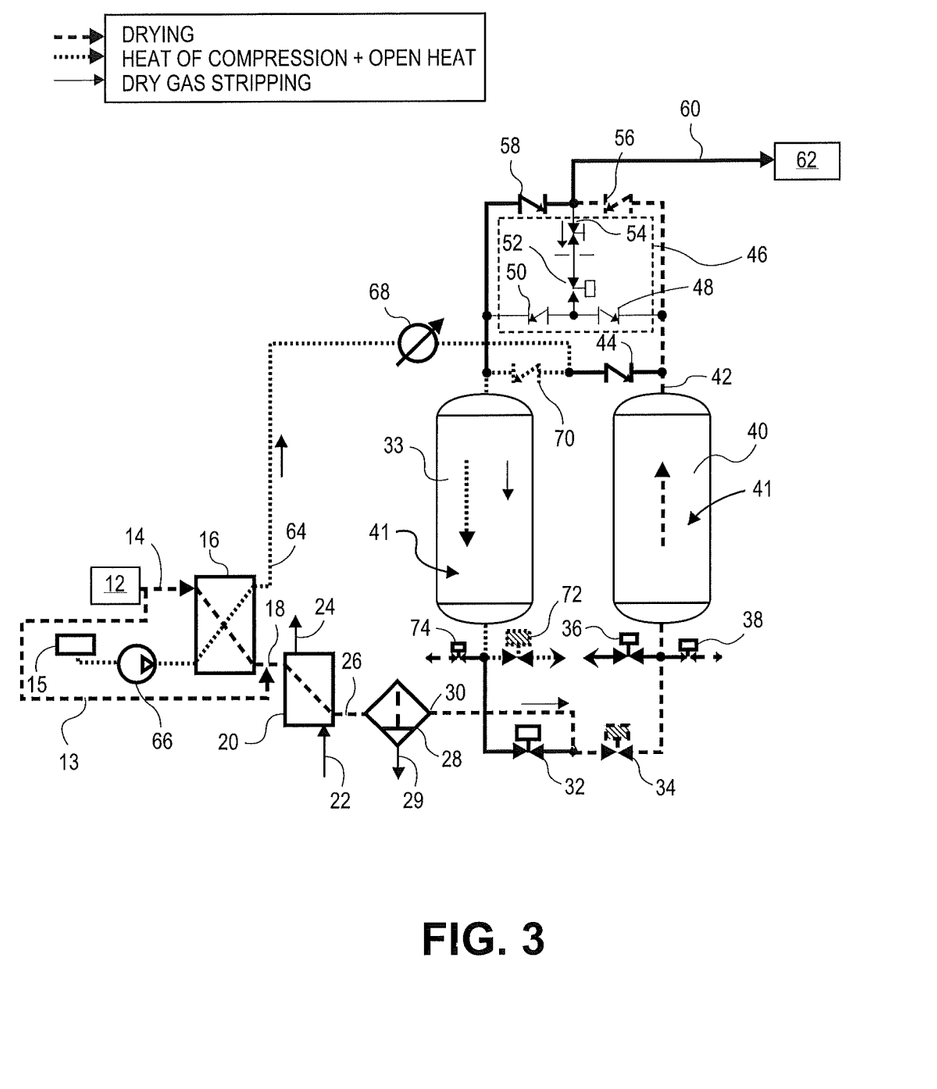
FIG. 3 is a schematic diagram of a gas drying system using compressor heat to preheat a gas used to regenerate an adsorbent in the drying system according to an another embodiment.

FIG. 3 illustrates a system 10 where the blower 66 is located upstream from the heat exchanger 16. The blower 66 is able to draw in ambient air through the purge inlet filter 15 and provide pressure to move it through the heat exchanger 16, the conduit 64, the trim heater 68, and either of the adsorption chambers 33 and 40 depending on which adsorption chamber is off-line.

Figure 4:
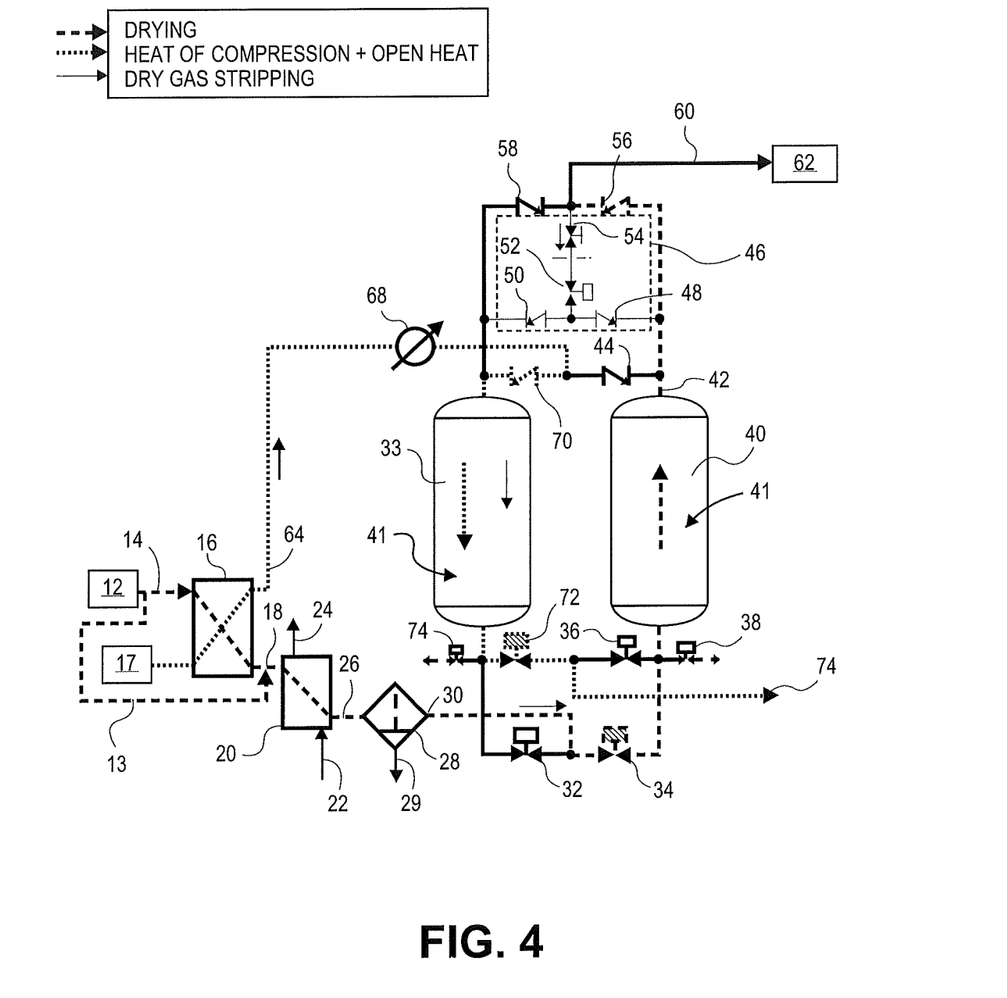
FIG. 4 is a schematic diagram of a gas drying system using compressor heat to preheat a gas used to regenerate an adsorbent in the drying system according to an another embodiment.

FIG. 4 illustrates a system 10 where there is no blower as part of the system 10. Rather the purge fluid is obtained from an external source and may or may not be ambient air. The purge gas supply 17 directly inputs the purge gas into the heat exchanger 16. The purge source or gas supply 17 provides the pressure to move the purge gas through the system 10. In some embodiments, a blower may be associated with the external purge gas supply 17.

Figure 5:
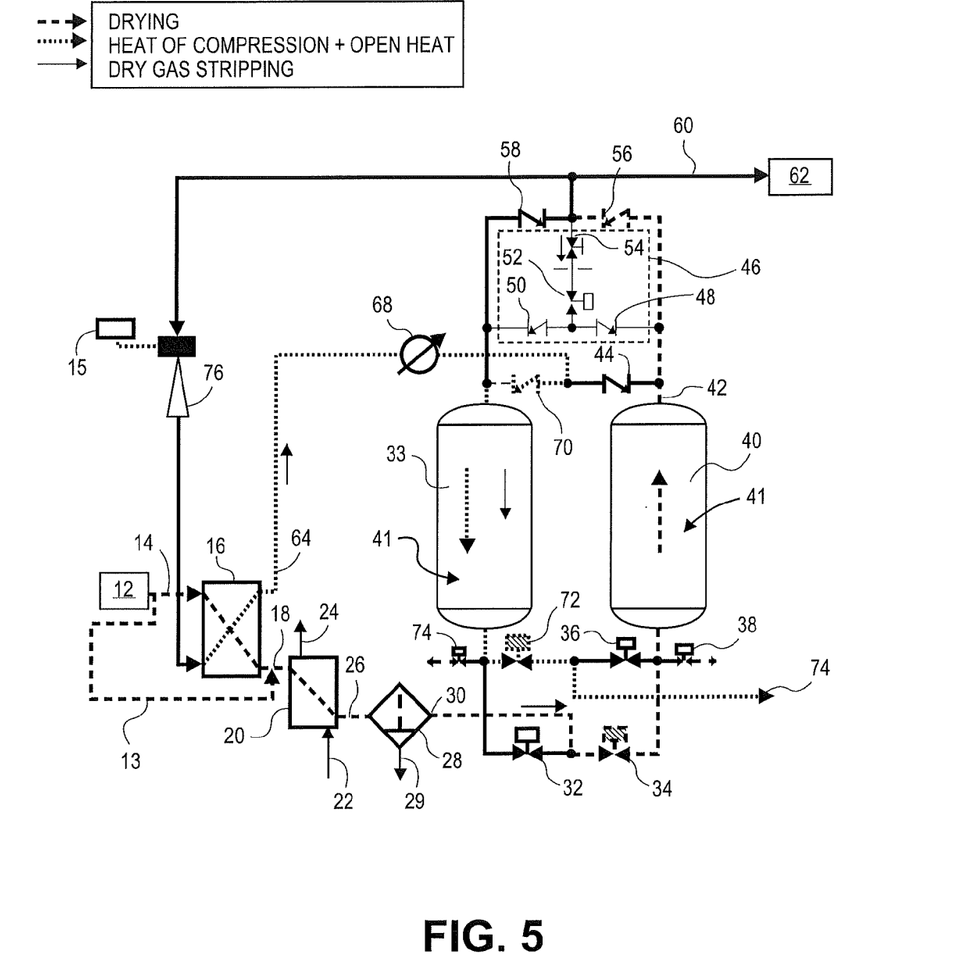
FIG. 5 is a schematic diagram of a gas drying system using compressor heat to preheat a gas used to regenerate an adsorbent in the drying system according to an another embodiment.

FIG. 5 illustrates a system 10 where a jet compressor 76 is used rather than a blower 66. The jet compressor 76 may be powered by dried fluid containing conduit 60. Ambient air may be drawn through the purge inlet filter 15 by suction created by the jet compressor 76. The jet compressor 76 also provides pressure to move the purge air through the system 10. In some embodiments, the conduit 60 may merely connect to the heat exchanger 16 without components 15 and 76. In such embodiments the pressure in conduit 60 will provide motive force to move gas through the regeneration loop. Thus, components 15 and 76 are optional.

Figure 6:
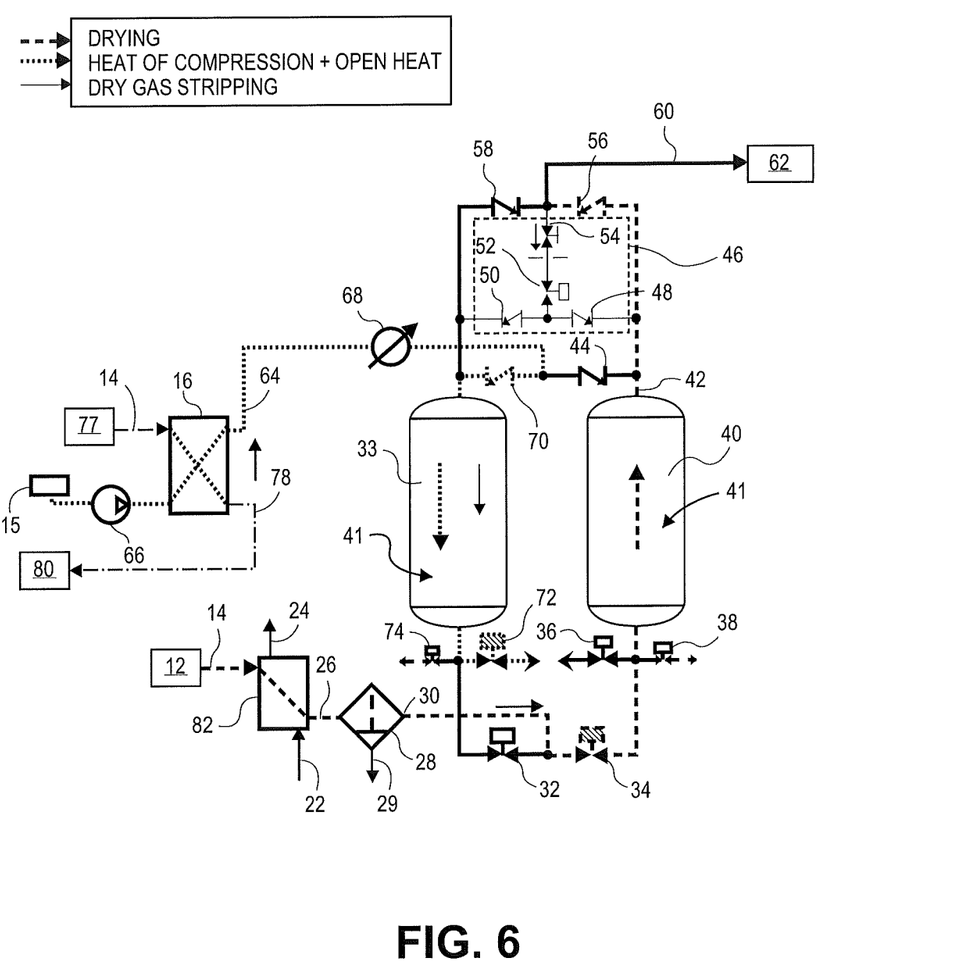
FIG. 6 is a schematic diagram of a gas drying system using compressor heat to preheat a gas used to regenerate an adsorbent in the drying system according to an another embodiment.

FIG. 6 illustrates a system where the fluid obtained from the compressor is not a compressed gas output from the compressor but rather cooling fluid used by the compressor. Heated compressor coolant from a compressor coolant supply 77 flows into the heat exchanger 16. Heat flows out of the heated compressor coolant in the heat exchanger 16 into purge air in the heat exchanger 16 the coolant then flows out of the heat exchanger 16 into conduit 78 and back to a coolant reservoir 80 associated with the compressor. While the blower 66 is illustrated to be located between the purge inlet filter 15 and the heat exchanger 16 one of ordinary skill in the art after reviewing this disclosure will understand that the blower 66 could be located at any of the places discussed above or substituted for any of the other purge gas pressure systems described above or any other suitable system or apparatus for providing a motive force for the purge fluid.

One of ordinary skill in the art after reviewing this disclosure will understand that the specific configurations of valves, conduit, and other apparatus described herein are meant to be exemplary only and do not limit embodiments accordance with the present disclosure. Other suitable configurations may also be used in accordance with the embodiment. One of ordinary skill in the art will also understand that some of the structures described herein, are optional and may be omitted and still be in accordance with the present disclosure.

Figure 7:
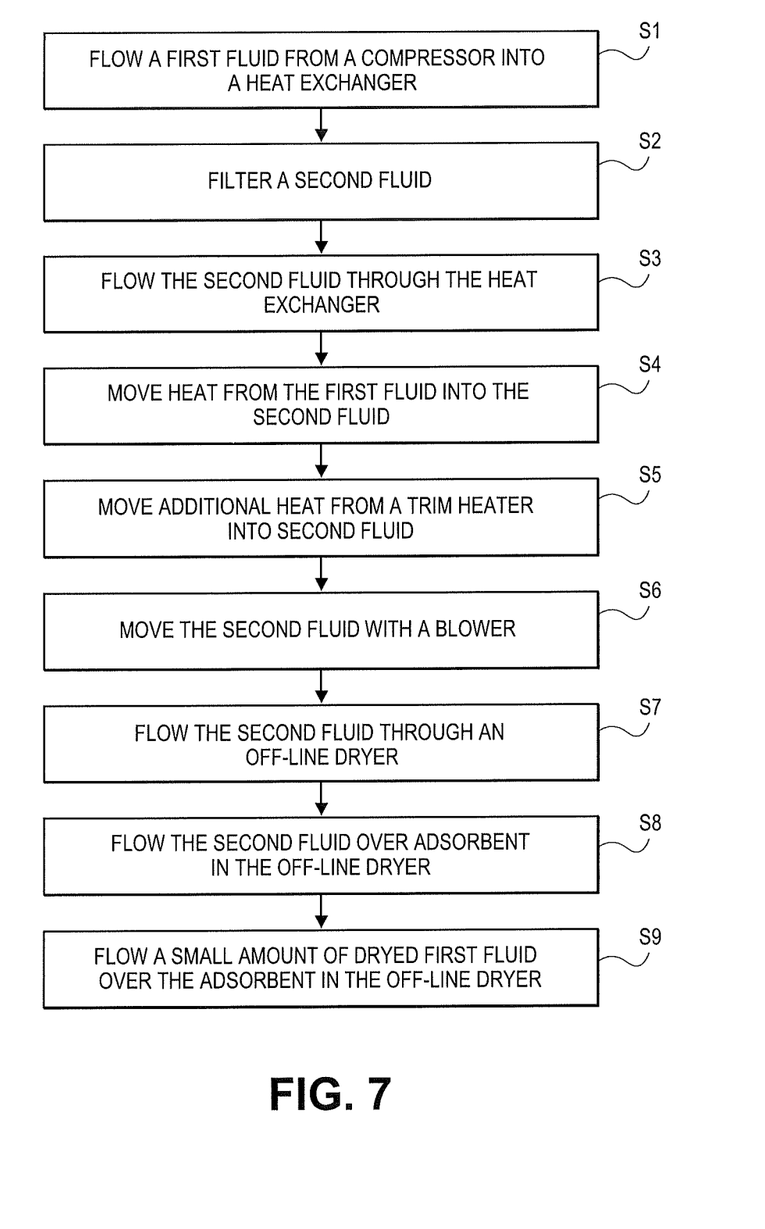
FIG. 7 is a flowchart showing steps accomplished according to a method consistent with some embodiments.

FIG. 7 illustrates a method of steps that may be accomplished in accordance with the present disclosure. It will be assumed that prior to the method described below the off-line adsorption chamber is first depressurized in preparation for regeneration. In step S1, flow of a first fluid from a compressor enters into a heat exchanger. This first fluid may be, in some embodiments, a compressed gas outputted from the compressor or as described above it may be a coolant that is been heated by the operation of the compressor. Optionally, a second fluid which may be, but not limited to, ambient air may be filtered. At step S3 the second fluid flows through the heat exchanger. At step S4 heat moves from the first fluid into the second fluid in the heat exchanger. Optionally, additional heat may be added to the second fluid by a trim heater or other means in step S5. Optionally, a blower or any other suitable apparatus provides a motive force to move the second fluid through the system. At step S7 the second fluid flows through an off-line adsorption chamber and, at step S8 the second fluid flows over and adsorbent in the off-line adsorption chamber thereby regenerating the adsorbent. Optionally, at step S9 a small amount of dried first fluid may also flow over the adsorbent in the off-line adsorption chamber to further regenerate the adsorbent. The small amount of dried first fluid may flow into the off-line adsorption chamber prior to, concurrently with, or after the second fluid flows through the adsorption chamber. The optional flow of the first fluid after it has been dried through the off-line adsorption chamber may also provide partial cooling of the adsorbent in the adsorption chamber. After the adsorption chamber has undergone the purge process the adsorption chamber may be re-pressurized to line pressure in the adsorption chamber may remain in a standby state until is put back online.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for regenerating an adsorbent in an off-line adsorption chamber comprising:
    a heat exchanger configured to exchange heat from a first fluid coming from a compressor and a second fluid, wherein only a portion of the first fluid flows through the heat exchanger and a portion of the first fluid that does not flow through the heat exchanger is reunited with the portion of the first fluid that does flow through the heat exchanger proximate to an outlet of the heat exchanger and the first fluid that does not flow through the heat exchanger is reunited with the portion of the first fluid that does flow through the heat exchanger prior to the first fluid that does not flow through the heat exchanger flowing through a cooling device;
    a conduit providing fluid communication between the second fluid exiting the exchanger and an off-line adsorption chamber;
    an adsorbent in the off-line adsorption chamber; and
    an outlet to the off-line adsorption chamber configured to discharge the second fluid from the off-line adsorption chamber.

2. The system of claim 1, further comprising a filter configured to filter the second fluid.

3. The system of claim 2, wherein the filter is located upstream from the heat exchanger.

4. The system of claim 1, further comprising a blower fluidly connected to the second fluid and configured to move the second fluid through the heat exchanger, conduit, and off-line adsorption chamber.

5. The system of claim 4, wherein the blower is located at any one of the following places: along the conduit, downstream from the outlet, upstream from the heat exchanger.

6. The system of claim 1, further comprising a jet compressor configured to move the second fluid through the system.

7. The system of claim 1, wherein the second fluid is ambient air.

8. The system of claim 1, wherein the first fluid is compressor coolant heated by the compressor.

9. The system of claim 1, wherein the first fluid is a fluid to be dried and has been compressed and heated by the compressor.

10. The system of claim 1, further comprising a valve system configured to move a fluid that has been dried by an online adsorption chamber to be routed into the off-line adsorption chamber and then to the off-line adsorption chamber discharge.

11. The system of claim 1, further comprising a fluid separator configured to separate liquid from a fluid to be dried prior to the fluid to be dried flowing through an online adsorption chamber.

12. The system of claim 1, wherein the second fluid is separated from the first fluid which has been compressed by the compressor such that when the second fluid flows through an off-line adsorption chamber none of the first fluid flows with the second fluid through the online adsorption chamber.

13. The system of claim 1, further comprising a source of the second fluid configured to provide the second fluid to the system under pressure sufficient to allow the second fluid to move through the system.

14. The system of claim 1, a trim heater configured to heat the second fluid prior to the second fluid entering the off-line adsorption chamber.

15. A system for regenerating an adsorbent in an off-line adsorption chamber comprising:
 means for exchanging heat between fluids configured to exchange heat from a first fluid coming from a compressor and a second fluid, wherein only a portion of the first fluid flows through the means for exchanging heat and a portion of the first fluid that does not flow through the means for exchanging heat is reunited with the portion of the first fluid that does flow through the means for exchanging heat proximate to an outlet of the means for exchanging heat and the first fluid that does not flow through the means for exchanging is reunited with the portion of the first fluid that does flow through the means for exchanging prior to the first fluid that does not flow through the means for exchanging flowing through a cooling device;
 a conduit providing fluid communication between the second fluid exiting the means for exchanging heat and an off-line adsorption chamber;
 means for desorbing moisture from the off-line adsorption chamber; and
 an outlet to the off-line adsorption chamber configured to outlet the second fluid from the off-line adsorption chamber.

* * * * *